United States Patent [19]

Harris et al.

[11] Patent Number: 4,543,018

[45] Date of Patent: Sep. 24, 1985

[54] TWO SECTION DEEP SUMP SOLIDS SLURRY RECOVERY SYSTEM

[75] Inventors: Gary R. Harris; Ronald L. Oda, both of Ponca City, Okla.

[73] Assignee: Conoco Inc., Ponca City, Okla.

[21] Appl. No.: 552,941

[22] Filed: Nov. 17, 1983

[51] Int. Cl.$^4$ .............................................. B65G 53/30
[52] U.S. Cl. .................................. 406/102; 406/109; 406/141; 406/198
[58] Field of Search ............... 406/108, 109, 141, 142, 406/143, 198, 152, 153, 102; 299/19

[56] References Cited

U.S. PATENT DOCUMENTS

| | | | |
|---|---|---|---|
| 2,301,617 | 11/1942 | Cox | 406/152 |
| 3,329,267 | 7/1967 | Millhiser | 406/142 |
| 3,366,282 | 1/1968 | Lucas | 406/137 |
| 3,870,373 | 3/1975 | Doerr | 406/109 |
| 4,060,281 | 11/1977 | Doerr . | |
| 4,143,921 | 3/1979 | Sweeney | 406/109 |
| 4,247,229 | 1/1981 | Evans | 299/19 |

Primary Examiner—Jeffrey V. Nase
Assistant Examiner—Mary Beth O. Jones
Attorney, Agent, or Firm—William J. Miller

[57] ABSTRACT

A sump for the deposit and removal of particulate material mixed with a fluid, comprises a first and second reservoir formed in the surface of the earth. The first and second reservoirs each have a top at the surface of the earth and extend from the surface to a predetermined depth in the earth to form a bottom. The reservoirs have a common wall portion between them from the surface of the earth to a location intermediate the surface and the predetermined depth where the common wall terminates forming an opening between the first and second reservoirs. Particulate material is deposited in one of the reservoirs so that said material is free to fill the reservoir and move through the opening to the second reservoir. Pumping apparatus is mounted in the remaining reservoir at a depth between the terminus of the common wall and the bottom.

8 Claims, 5 Drawing Figures

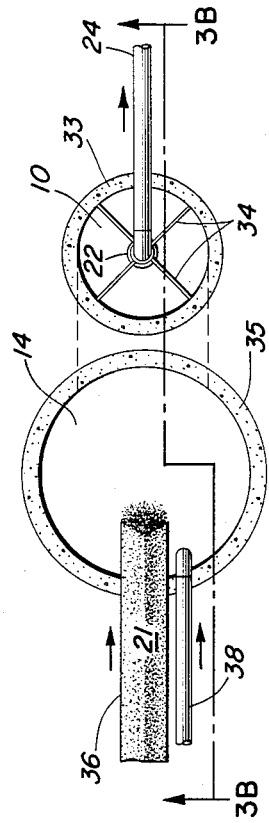
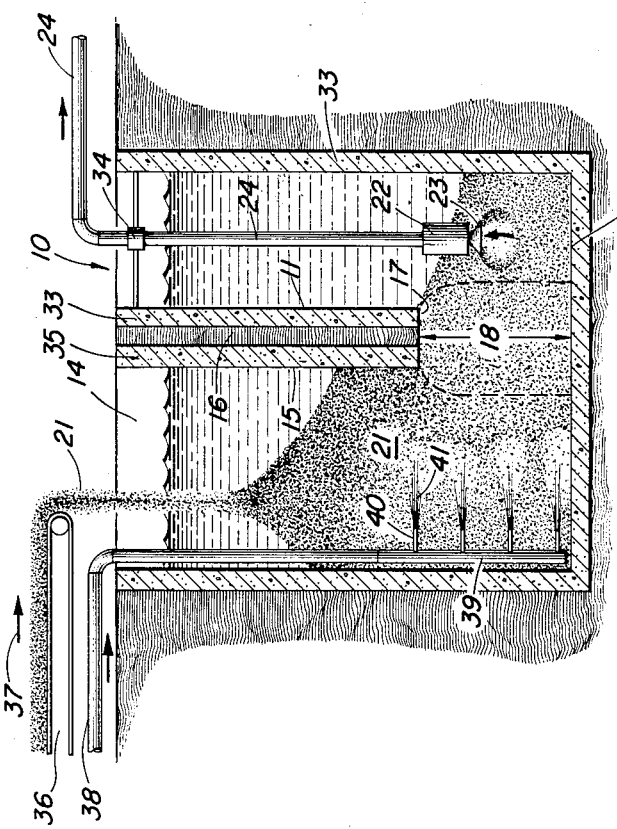
fig.3A
fig.3B
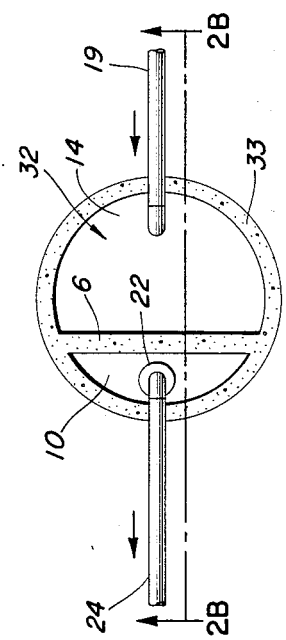
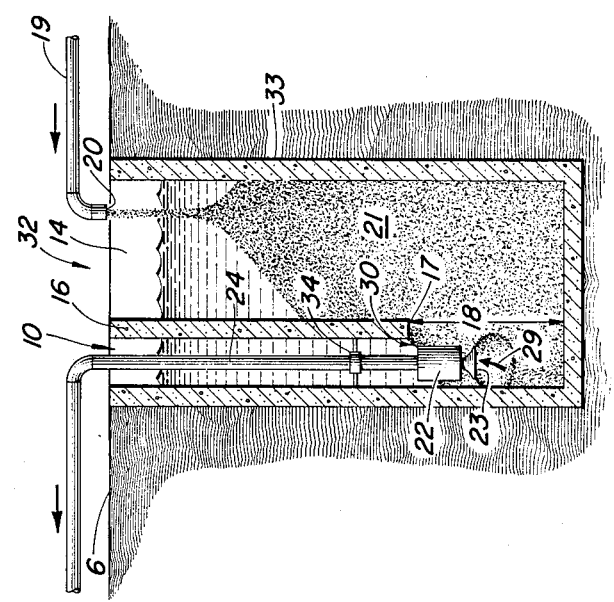
fig.2A
fig.2B

TWO SECTION DEEP SUMP SOLIDS SLURRY RECOVERY SYSTEM

BRIEF DISCUSSION OF THE PRIOR ART

The best reference known to applicant is a sump disclosed in U.S. Pat. No. 3,870,373 entitled "Underground Coal Slurry Concentrating Sump" by Richard Doerr et al. and assigned to the same assignee as this invention. This patent discloses a long sloping sump with an adjacent room for pumps mounted in the room. The pump mouth extends into the lowest portion of the adjacent sump. Material is then removed from the sump into the mouth pump and out through the usual slurry pipes. It also includes means for adding water to the sump and adding slurry to the deep sloping sump.

U.S. Pat. No. 4,060,281 comprises a sump similar to the above except that a passageway is provided between the two where a metering device is mounted so that coal can be transferred from the sump to the mouth of the pump through a metering apparatus thereby improving the concentration of coal to the slurry being pumped.

BRIEF DISCUSSION OF THE INVENTION

One of the basic problems with a sump such as the prior art described is the difficulty in constructing a sump having parallel side walls and of the large longitudinal dimension and depth in a mine. The environs in a mine make it extremely difficult to form such a sump since it must be dug with a bulldozer and normally blasting out of the mine floor. There is also danger of the walls collapsing due to the extreme pressure on the sides of the sump if the sump is made at a location which is deep in a mine. This invention discloses a method for forming a sump which will function as well as or better than the above-referenced sump and uses existing technology familiar to mining engineers and technicians and yet is easy to form and extremely strong so that it possesses no danger to those digging the sump nor will it collapse once the sump is dug.

The preferred sump is formed by digging two shafts, one vertically in the ground and the second one sloping so that it intersects the vertical sump at or near the bottom of the vertical sump. Depending on the material, a shaft is sunk into the walls which may be lined or unlined. Since most mines have clay in or near the coal-bearing strata, the shaft will probably have to be lined to prevent water adsorption into the clay. The pump is mounted at a fixed location in the vertical shaft in the opening between the vertical and sloping shaft. A slurry emptying duct empties slurry from a remote location into the sump. Water may also be added or removed as necessary to maintain an adequate level of fluids in the sump. A second embodiment comprises two vertical sumps. One sump is used for material addition and the second sump for pump placement. A third embodiment uses a single shaft with a partition part way down the shaft.

BRIEF DESCRIPTION OF THE FIGURES

FIG. 2a is the top view of a modified version of the apparatus shown in FIG. 1;

FIG. 2b is a crosssectional view of the apparatus illustrated in 2a taken through lines 2b—2b;

FIG. 3a is the top view of another embodiment of the apparatus illustrated in FIG. 1; and FIG. 3b is a crosssectional view of the apparatus illustrated in 3a taken through lines 3b—3b.

DETAILED DESCRIPTION OF THE INVENTION

Figure 1:
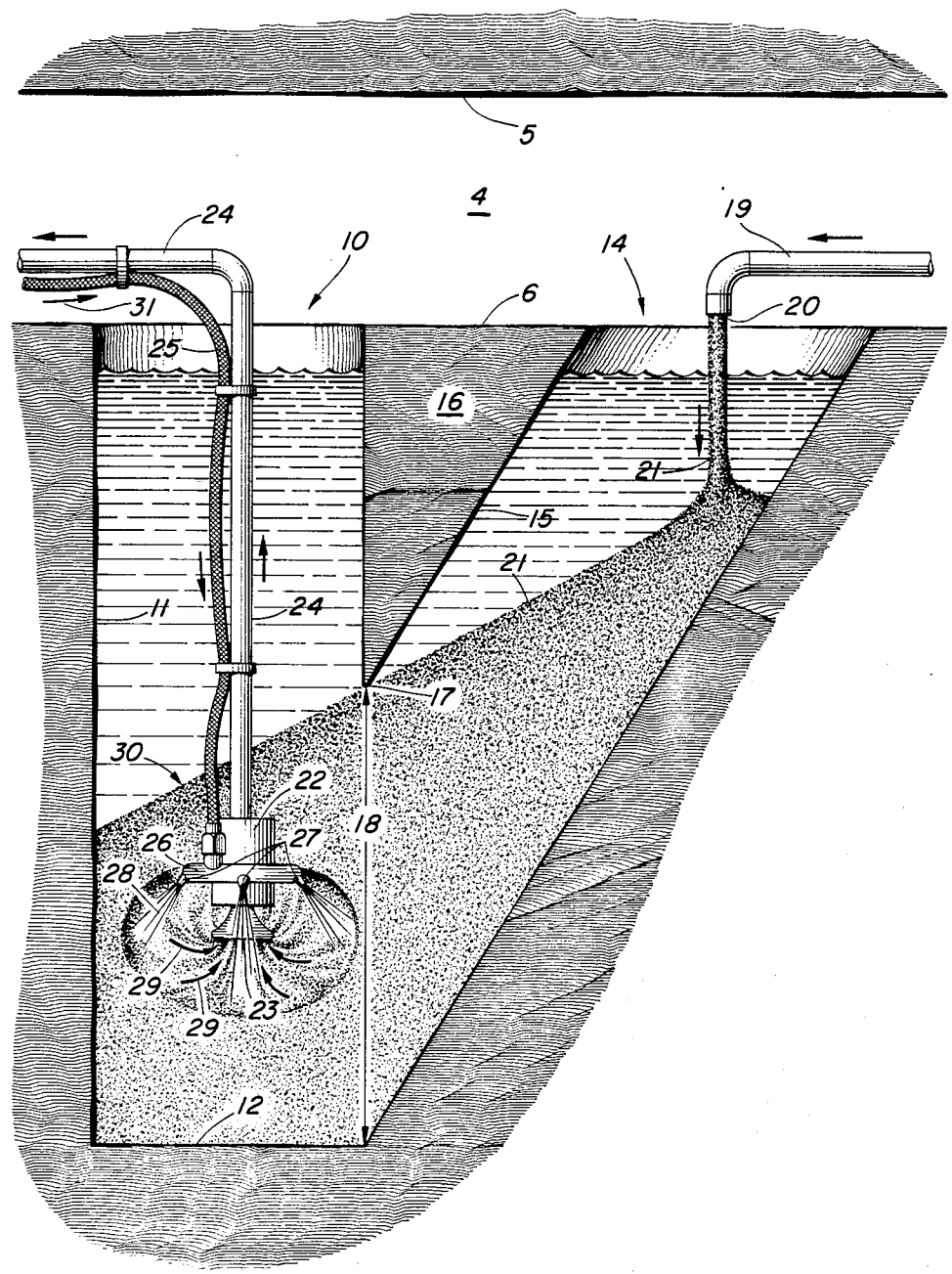
FIG. 1 illustrates a sump formed by a vertical shaft and a sloping shaft.

Referring to all of the drawings but in particular to FIG. 1, a mine tunnel 4 has a roof 5 and floor 6. Formed into floor 6 is a first shaft 10 which has a substantially vertical axis and in the drawing is not illustrated as being lined; however, it may be lined with any number of materials such as brick, cement or steel, as necessary. If the shaft is sunk into solid rock then, perhaps, no lining is necessary. Some surfaces, particularly clay, found commonly in coal mining may require a lining since clay tends to absorb water. If the material tends to sluff, lining will also be necessary. Other conditions, such as sand, may require lining. Linings, however, are state of the art in any shaft-forming operation and, therefore, need not be further discussed. Shafts are generally formed by a boring machine if the shaft is being formed on the surface of the earth or they may be dug in the usual manner, the lining being placed at the time of the digging.

Shaft 10 has a side wall 11 and a bottom 12. The diameter of shaft 10 and its depth to bottom 12 will be predetermined by the holding capacity requirements of the system. A second shaft 14 is formed at an angle such that it will intersect shaft 10 in or near the bottom 12 of shaft 10. Shaft 14 has a side wall 15. A common wall portion 16 terminates at a point 17 leaving an opening 18 to provide communication between shaft 14 and shaft 10. A slurry transportation pipe 19 is positioned over second shaft 14 and has an outlet 20 so that material 21 can fall into shaft 14 tending to fill shaft 14 and shaft 10 with material 21. A pump 22 is positioned between the terminus 17 of common wall portion 16 and bottom 21. It is preferably mounted toward the upper portion of opening 18 so that pump 22 will not be buried too deep into the material 21. The maximum depth that material 21 will reach in first shaft 10 is illustrated by arrow 30 which is determined by the terminus of wall portion 16 and the material repose of the material being dumped into shaft 10.

Pump 22 has a mouth 23. Pipe 24 conveys the material from pump 22 up shaft 10 and to a remote location not illustrated. A pipe 25 is connected to manifold 26 which is mounted to pump 22. A plurality of flushing jets 27 is attached to manifold 26 and adjusted so that fluid flowing in the direction of arrow 31 will be directed down pipe or hose 25 into manifold 26 and out of the jets 28. The jets 28 fluidize the material in the vicinity of pump mouth 23 so that the material will flow in the direction of arrow 29 into pump mouth 23.

OPERATION

The device of FIG. 1 operates in the following manner. Slurry containing fluid, such as water, and material, such as coal, enters through a pipe 19 and is deposited into shaft 14 from outlet 20. The fluid will generally be added until it fills both sump 14 and sump 10. Material 21 will generally settle out of the fluid and be deposited in the bottom of shaft 14, through the opening 18 and into shaft 10. As previously stated, the maximum height that the material will reach in shaft 10 is determined by the terminus 17 of the common wall 16 between shaft 10 and shaft 14 and the angle of repose of the material. This surface or maximum height is illustrated by arrow 30. Material 21 can buildup in shaft 14 to the part of completely filling 14, without adversely affecting operations in shaft 10. The pump 22 is inserted below the surface defined by arrow 30 so that the pump will at all times be drawing material and fluids into mouth 23 of pump 22. If the system is discontinued in operation for a substantial period of time, material 21 will tend to solidify. In order to refluidize the material, fluidizing means are provided which include a pipe or hose 25 which conveys fluid in the direction of arrow 31 to manifold 26 which distributes to a plurality of jets 27 that are directed downwardly to cause jets of fluid 28 to impinge on the material in the vicinity of mouth 23. The jet action loosens the solidified material so that it can be sucked up by pump 22 thereby lifting the material out of the sump through pipe 24 and conveying the material to a remote location, not illustrated.

Another factor in determining how far pump 22 should be immersed into shaft 10 is the ability to remove the pump for maintenance. Thus, if pump 22 is sunk toward the bottom 12 of shaft 10, the weight of coal above it may make it extremely difficult to dislodge if material 21 has settled for any appreciable time; therefore, it is best to place pump 22 closer to the surface of the material as shown by arrow 30 so that when the fluidizing jets refluidize the coal in the vicinity of jets 27 the pump can be removed since little unfluidized material remains between the top of pump 22 and the surface of material 21.

It should also be noted that in the configuration shown in FIG. 1 pump 22 is mounted permanently at the location illustrated. It does not require hoisting apparatus or other means to continually move the pump vertically for purposes of moving material 21. Thus the installation of the pump is much easier than where the pump is moved either vertically or horizontally during the time the pump is in use.

ALTERNATE EMBODIMENTS

Referring to FIGS. 2a and 2b a second embodiment is illustrated where a single shaft 32 is sunk into floor 6. In this embodiment shaft 32 is illustrated as having a lining 33 made of poured concrete. It is obvious that other linings, as previously discussed, can be used. A partition 16 or common wall portion is inserted in shaft 32 to form the equivalent of shaft 10 and shaft 14. The apparatus illustrated in FIG. 2a functions in the same manner as does the apparatus in FIG. 1, that is, material flowing through slurry pipe 19 drops from outlet 20 and is deposited into the bottom of shaft portion 14 as material 21. Common wall 16 has a terminus 17 and an opening 18 which allows material to communicate from shaft 14 to shaft portion 10 with shaft portion 10 having its maximum height defined by arrow 30. Mouth 23 of pump 22 sucks in the direction of arrow 29 and up pipe 24 to a remote location. Pipe 24 may be retained by a support 34. Fluidization jets around pump mouth 23 might be used to fluidize coal before being sucked into pump 22.

A third embodiment is illustrated in FIGS. 3a and 3b and has two vertical shafts 10 and 14 with side walls 11 in shaft 10 and 15 in shaft 14. Shaft 10 is shown having a lining 33 of cement and shaft 14 is shown having a lining 35 of cement. Common wall 16, as previously discussed, has a terminus 17 which defines an opening 18 for permitting the communication of material 21 from shaft 14 to shaft 10. Rather than slurry line 19 as previously discussed, this embodiment illustrates a conveyer belt 36 moving in the direction of arrow 37 and depositing material 21 in the same manner as did slurry pipe outlet 20. In order to alleviate the compaction of the material, a fluidizing system is illustrated in shaft 14 and comprises pipe 38 with a manifold 39 which is connected to a plurality of jets 40 in the direction illustrated causing fluidization of the material 21 and also tending to force material 21 through water jets 18 to the mouth 23 of pump 22. Pump 22, as previously discussed, is coupled through pipe 24 to a remote location. Opening 18 can be made in several ways and is probably best made by an archway between shaft 14 and shaft 10. A plurality of supports 34 may be used to position pipe 24 in shaft 10. Apparatus described in FIGS. 3a and 3b operates in the same manner as that discussed except that a conveyer 36 is illustrated which moves material 21 along its surface and deposits it into shaft 14. Fluidizing jets 40 are supplied with fluid from pipe 38 which distributes the material to all of the jets through manifold 39. The jets direct fluid in the manner illustrated into material 21 fluidizing it and forcing it through opening 18 into shaft 10 for removal by pump 22.

Only three types of sumps have been illustrated. It is obvious, however, that several sumps may be formed around sump 10 or for that matter several sumps containing pump 22 can be formed around sump 14 depending upon the need for maintenance of the pumps or the need for storage capacity and removal capacity.

It is obvious that changes can be made in the application and still be within the spirit and scope of the invention as disclosed in the specification and appended claims.

What is claimed is:

1. A sump for the deposit and removal of particulate material which is mixed with a fluid comprising:
   a. a first reservoir formed in the surface of the earth;
   b. a second reservoir formed in the surface of the earth, said first and second reservoirs having a top at the surface of the earth and extending from said surface to a predetermined depth in the earth forming a bottom, and wherein each of said reservoirs has a common wall from said surface to a location intermediate said surface and said predetermined depth wherein said common wall terminates forming an opening between said first and second reservoirs;
   c. means for depositing particulate material in said first reservoir so that said material is free to fill said first reservoir and move through said opening to said second reservoir, said material filling second reservoir has an upper surface wherein said upper surface is inclined at an angle equal to the angle of repose of said material in said second reservoir;
   d. pump means mounted in said second reservoir under said upper surface of said material at a depth greater than said upper surface of said material but less than a depth where said pump cannot be withdrawn; and
   e. means for adding fluid to said sump.

2. A sump as described in claim 1 wherein said second reservoir is a vertical shaft and wherein said first reservoir is a first shaft which is formed at a slope to intersect said second reservoir.

3. A sump as described in claim 2 wherein said pump is mounted in said second reservoir between said terminus location and said bottom.

4. Apparatus as described in claim 1, 2, or 3 wherein said first reservoir is formed by a shaft and said second reservoir is formed by a partition in said shaft extending from the top of said shaft in a location intermediate said top and said bottom.

5. Apparatus as described in claim 1, 2, or 3 wherein said first reservoir comprises a first vertical shaft, said second reservoir comprises a second vertical shaft adjacent said first shaft, and said opening comprises a thrid horizontal shaft between said first and second vertical shafts.

6. Apparatus as described in claim 5 wherein said third horizontal shaft forms the bottom of said first and second shafts.

7. Apparatus as described in claim 1, 2, or 3 wherein said pump means includes fluidizing jets surrounding said pump means.

8. Apparatus as described in claim 1, 2, or 3 wherein said second reservoir includes fluidizing jets directed toward said opening and said pump means.

* * * * *